United States Patent [19]

Kuniharu

[11] Patent Number: 4,829,392

[45] Date of Patent: May 9, 1989

[54] MAGNETIC RECORDING APPARATUS

[75] Inventor: Yasutaka Kuniharu, Tokyo, Japan

[73] Assignee: Kabushiki Kaisha Kenwood, Tokyo, Japan

[21] Appl. No.: 53,120

[22] Filed: May 22, 1987

[30] Foreign Application Priority Data

May 30, 1986 [JP] Japan ................................. 61-123271

[51] Int. Cl.$^4$ ..................................... G11B 5/03/5/02
[52] U.S. Cl. ............................................. 360/66; 360/68
[58] Field of Search ........................ 360/66, 68, 65, 31

[56] References Cited

U.S. PATENT DOCUMENTS

| 4,345,281 | 8/1972 | Philips | 360/66 |
| 4,353,100 | 10/1982 | Inoue | 360/66 |
| 4,454,548 | 6/1984 | Jensen | 360/66 |
| 4,713,700 | 12/1987 | Kuwahara et al. | 360/66 |

Primary Examiner—Vincent P. Canney
Attorney, Agent, or Firm—Gerald J. Ferguson, Jr.

[57] ABSTRACT

Magnetic recording apparatus to improve the reproduction characteristics in an AC bias magnetic head recording. The apparatus includes an AC bias signal oscillator for suppressing an AC bias current which flows in a magnetic head when a record signal has a high frequency and also a large amplitude.

1 Claim, 9 Drawing Sheets

MAGNETIC RECORDING APPARATUS

BACKGROUND OF THE INVENTION

1. Field of the Invention

The present invention relates to a magnetic recording apparatus, and more particularly to a magnetic recording apparatus of the type that an input signal is recorded on magnetic recording medium through an AC bias process.

2. Related Art

Slicing the voltage level of a signal to be applied to a magnetic head has been proposed to improve the maximum output level characteristics in the high frequency range (e.g., Japanese Unexamined Patent Publication No. 60-1685).

There is also known a method of controlling a bias quantity to improve the maximum output level (hereinafter abbreviated as MOL) at a high frequency range, such as Dolby-HXPRO (trademark).

The former method slices the waveform of an input signal superposed upon a bias signal. This method however has a problem that the high frequency characteristics are not improved.

Also in the latter method, some problems are that it takes a long time to respond to a tone-burst attack during recording/reproducing and that the circuit structure becomes complicated.

SUMMARY OF THE INVENTION

The above problems are solved by the magnetic recording apparatus according to the invention. The apparatus records a record signal on magnetic medium through an AC bias process and comprises an AC bias signal oscillator for generating a fixed level AC signal and a suppressor for suppressing an AC bias current which flows in a magnetic head when the frequency of the record signal is high and also the amplitude of the record signal is large.

In one aspect of the present invention, the apparatus includes a first suppressor for suppressing a recording current which flows in the magnetic head when the frequency of the record signal is high and also the amplitude of the record signal is large and a second suppressor for suppressing an AC bias current which flows in the magnetic head during the suppression of the record signal by the first suppressor.

DETAILED DESCRIPTION OF THE PREFERRED EMBODIMENT

Signals are recorded in magnetic recording medium in accordance with a magnetic flux radiated from the gap of a magnetic head (hereinafter abbreviated simply as "head"). A magnetic flux has the same phase as that of a recording-current flowing through the head.

Figure 1A:
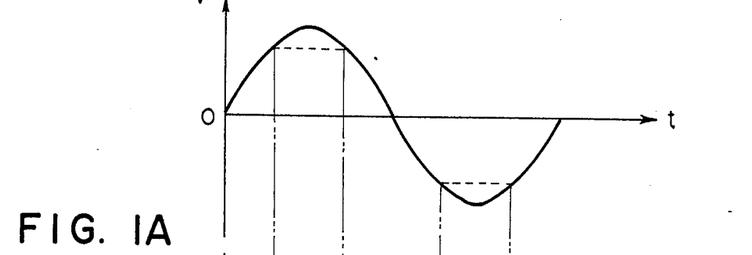
FIGS. 1A and 1B respectively show the waveform of the sliced voltage applied to a magnetic head and the waveform of the magnetic head current induced by the sliced voltage.
Figure 1B:
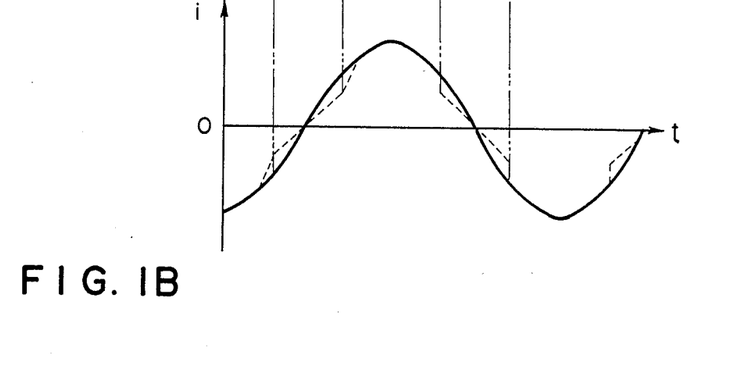

The impedance of a head is inductive so that the current flowing through the head lags by 90 degrees in phase from the applied voltage. If the voltage applied to the head is sliced, the bias current flowing through the head is caused to have crossover distortion, but the peak value of the bias current does not change as shown in FIGS. 1A and 1B. In FIG. 1A, a voltage waveform applied to a head is shown as $v = \sin\omega t$ and a broken line indicates the slice level. In FIG. 1B, a current waveform in the head is shows as $i = -\cos\omega t$ and a broken line indicates the actual waveform obtained through slicing the applied voltage. As seen from the Figures, the peak value of the current waveform does not change even if the voltage waveform is sliced.

The high frequency characteristics dependent on the peak value of a bias current are not improved by slicing an applied voltage because it causes no change in peak value.

Figure 2:
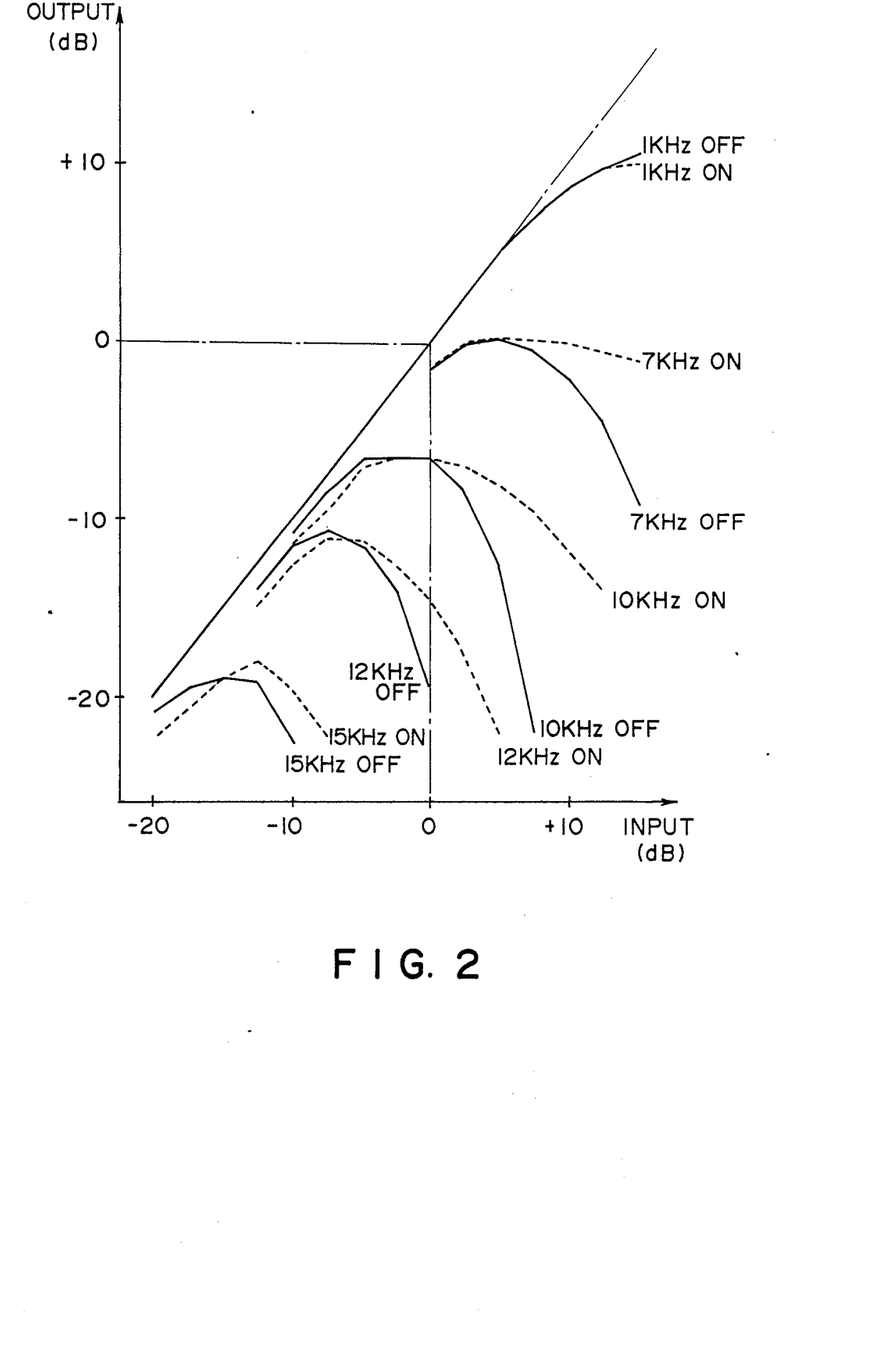
FIG. 2 shows the output vs. input characteristics in a magnetic recording according to the voltage slice process.

It was found that the MOL is not improved by slicing a current flowing through the head. However, the output performance is less degraded if an input signal is in excess of the MOL as shown in FIG. 2. It can be considered that this is the effect obtained by slicing an input signal in the former method.

In FIG. 2, "ON" indicates that a current flowing through a head is sliced, whereas "OFF" indicates that a current is not sliced, the record signals having frequencies of 1, 7, 10, 12 and 15 KHz, respectively.

Figure 3:
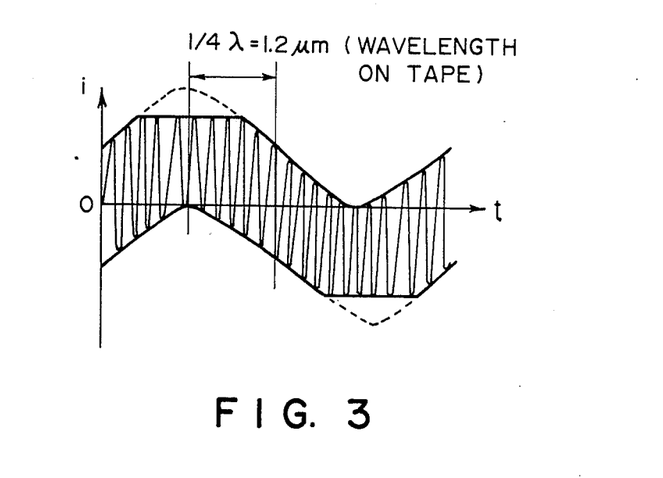
FIG. 3 shows the waveform of the magnetic head current in case of slicing the bias current.

An example of the current waveform in a head is shown in FIG. 3 with the bias current sliced. When a bias current is sliced, the bias magnetic field produced at the head gap is reduced so that a record signal, of short wavelength is recorded at that moment in the magnetic recording medium as a signal larger in amplitude than that without a bias slice. However, at the next moment when the bias current is not sliced, the corresponding bias magnetic field is produced at the head gap and the signal recorded in the recording medium is demagnetized, i.e., a bias demagnetization occurs. Assume now that the frequency of a record signal is 10 KHz and the distance between a sliced waveform point and a not-sliced waveform point is ¼ wavelength. Then, the ¼ wavelength distance on a magnetic tape at a speed of 4.8 cm/sec corresponds to 1.2 micron. The flat area of the critical of the gap of a head is not so sharp so that even a bias current is changed, the bias quantity to the magnetic material at one point on the magnetic recording medium does not change. Thus, the recorded signal in the magnetic recording medium is subjected to a bias demagnetization. Consequently, even if the bias current is transiently reduced, improvement on the MOL can not be obtained. It can be said that the peak value of a bias current determines the MOL at the flat area of the critical zone. Thus, it can be considered that the improvement of the high frequency characteristics at levels where a record signal exceeds the MOL results from an equivalent reduction in the level of the record signal caused by slicing it.

As understood from the above, it can be said that the high frequency characteristics are not improved so much by slicing the bias but are improved by reducing the record signal level.

Figure 4:
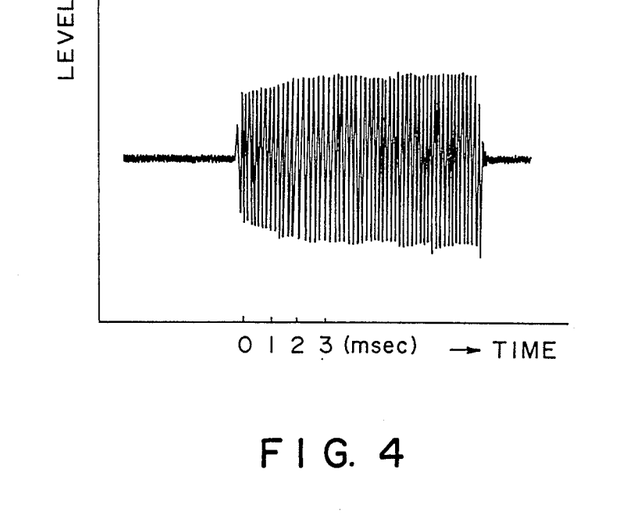
FIG. 4 shows the waveform of a reproduced signal for a tone-burst in the Dolby-HXPRO process.

In case of the Dolby-HXPRO, the bias quantity is controlled using high frequency signal components to improve the high frequency characteristics. This method is agreeable in that the MOL at the high frequency range is theoretically improved. However, since the operation is basically controlled by a feedback loop, a response time for a bias control is constrained. Thus, a response time may become several milliseconds seconds for the stable operation of a feedback loop. A arises problem in that a response is not very good to a tone-burst attack as shown in FIG. 4 which shows a response time of about 3 msec to a 10 KHz tone-burst attack during recording/reproducing. Further, Dolfy-HYPRO requires a number of components for the circuit and a specific adjustment.

Figure 5:
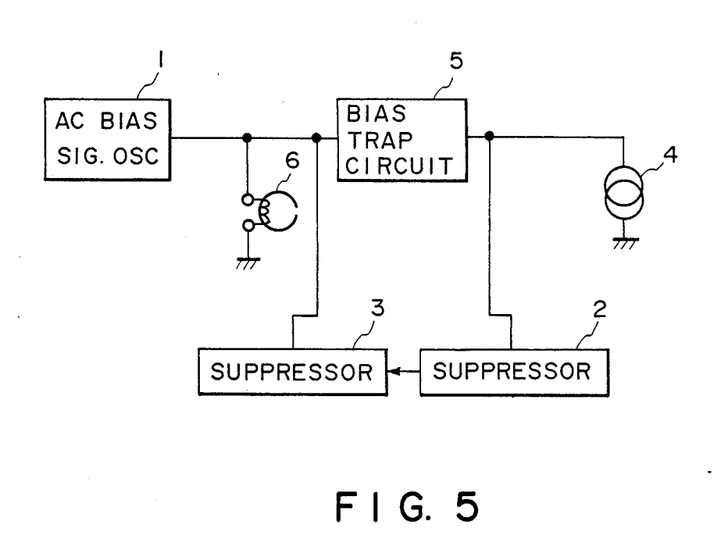
FIG. 5 is a schematic block diagram of the apparatus according to the present invention.

An example of the circuit construction of the magnetic recording apparatus according to the present invention is shown in FIG. 5. The apparatus records a record signal from a record signal amplifier 4 through an AC bias process. The apparatus includes an oscillator, for generating a fixed AC bias signal, a suppressor 2 for suppressing recording current flowing through a record head 6 when the frequency of the record signal is high and the amplitude of the record signal is large, and another suppressor 3 for bypassing an AC bias current flowing through the record head 6 when the record signal has a high frequency and a large amplitude. Alternatively the suppressor 2 may be omitted. Reference number 5 denotes a bias trap circuit.

With the construction as above of this invention, the high frequency components of a record signal are suppressed and also an AC bias current is suppressed when the record signal has a high frequency and a large amplitude.

It was found from the experiments that the improvement of the high frequency characteristics for a record signal in excess of the MOL are achieved through a reduction in level of the record signal. Thus, the record signal having a high frequency and a large amplitude is suppressed to improve the high frequency characteristics for a record signal in excess of the MOL. Further, by reducing an AC bias current, the MOL at a high frequency range is improved.

Figure 6:
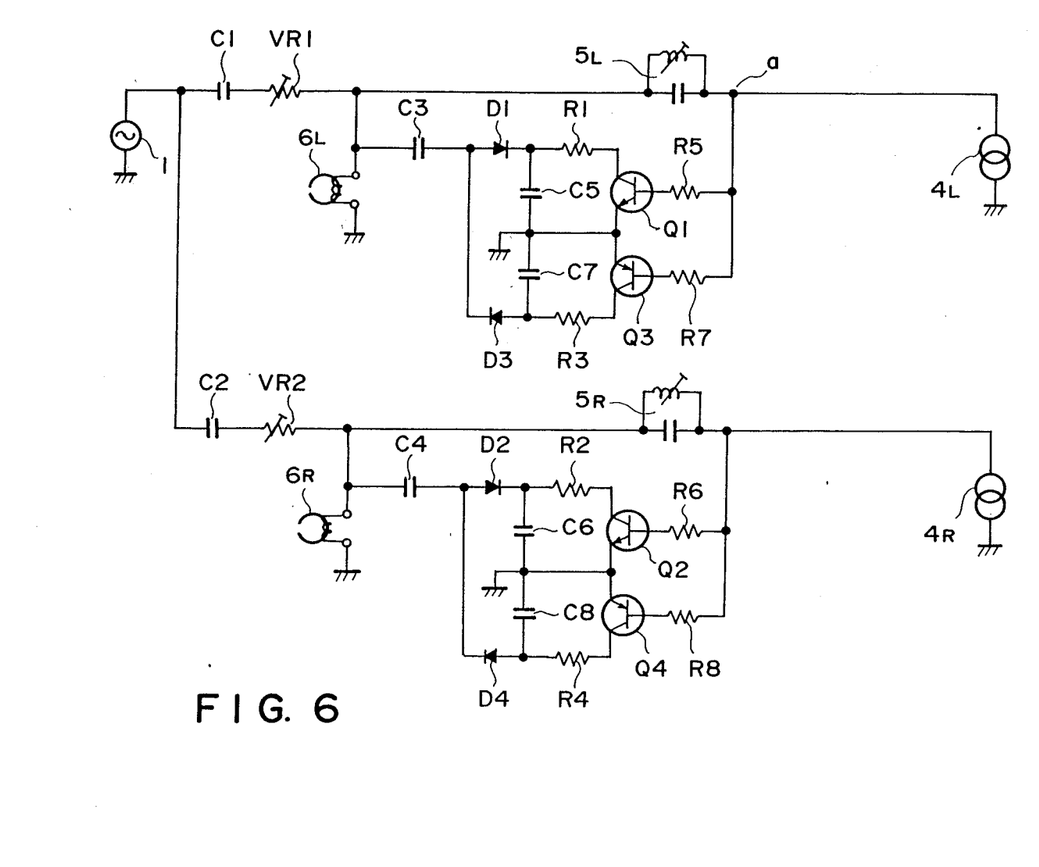
FIG. 6 is a circuit diagram of an embodiment according to the present invention.

FIG. 6 is a more detailed circuit diagram showing the construction of an embodiment of the magnetic recording apparatus of this invention.

First in the right channel, an output from a record signal amplifier 4L is applied through resistors R5 and R7 to the bases of transistors Q1 and Q3 having emitters grounded. One end of the head 6L is connected via capacitor C3, diode D1 and resistor R1 to the collector of the transistor Q1, the cathode of the diode D1 being grounded through capacitor C5. The collector of the transistor Q3 is connected via resistor R3, diode D3 and the capacitor C3 to the one end of the head 6L, the anode of the diode D3 being grounded through capacitor C7. A suppressor is thus constructed.

An output of the record signal amplifier 4L is applied via a bias trap circuit 5L to the head 6L, whereas an output of an oscillator 1 for generating a fixed AC bias signal is applied via a serial circuit of capacitor C1 and rheostat VR1 to the head 6L. An output of the record signal amplifier 4 and an output of the AC bias signal oscillator 1 are suppressed by the suppressor.

The base-emitter diodes of the transistors Q1 and Q3 and base resistors R5 and R7 constitute the suppressor 2, whereas the capacitors C3, C5, C7, diodes D1, D3, resistors R1, R3, and emitter-collector switching paths of the transistors Q1 and Q3 constitute the suppressor 3.

The capacitor C3 serves as a coupling capacitor for the bias signal. The diodes D1, D3, and capacitors C5, C7 constitute peakhold circuits for the bias voltage to be applied to the head 6L. The resistors R1, R3, and emitter-collector paths of the transistors Q1, Q3 constitute discharge paths for the peak-hold circuits. While the transistors Q1, Q3, are turned on, the discharge path serves as a shunt circuit through which the bias current to the head 6L is shunted via the capacitor C3.

The peak-hold circuits are used because the head impedance is inductive.

If the bias current to the head 6L is abruptly reduced from a steady state, a large inverse voltage is induced at the inductive head 6L so that the bias current is not reduced abruptly. The positive/negative peak-hold circuits are provided to absorb such a large inverse voltage. Namely, assuming that the bias voltage is positive and it is reduced, the negative inverse voltage induced at the inductive head is absorbed by the negative peak-hold circuit.

Similarly in the right channel, the circuit is constructed of a bias trap circuit 5R between a record signal amplifier 4R and a head 6R, resistors R2, R4, R6, R8, transistors Q2, Q4, diodes D2, D4, capacitors C4, C6, C8, capacitor C2 between the AC bias oscillator 1 and the head 6R, and rheostat VR2.

The base-emitter diodes of the transistors Q1 to Q4 and the base resistors R5 to R8 correspond to the suppressor 2 in FIG. 5, whereas the capacitors C3 to C8, the diodes D1 to D4, the resistors R1 to R4 and the collector-emitter paths of the transistors Q1 to Q4 correspond to the suppressor 3 in FIG. 5. The capacitors C3 and C4 are coupling capacitor for the bias current The diodes D1 to D4 and the capacitors C5 to C8 constitute peak-hold circuits for the bias voltage to be applied to the heads 6L and 6R. The resistors R1 to R4 and the emitter-collector switching paths of the transistors Q1 to Q4 operate as discharge paths for the peak-hold circuits so that the bias current to the head, is shunted via the capacitor C3 or C4 while the transistors Q1 to Q4 is turned on.

The operation of the circuit will be described in connection with the left channel.

If a high frequency, large amplitude record signal is supplied, the transistor Q1, Q3 are turned on. Therefore, the record signal is suppressed by the base-emitter diode of the transistor Q1, Q3, and the base resistor R5, R7 and by the constant current source resistance of the record signal amplifier 4L. The suppressed record signal is superposed on a bias current at the head 6L.

The control of the bias current will be described. The transistor Q1, Q3 is maintained turned off until a record signal is subjected to suppression. The capacitor C5, C7 holds a voltage slightly lower than the peak value of the bias voltage due to a voltage drop across the coupling capacitor C3. Upon suppression of a record signal with the transistor Q1, Q3 being turned on, the capacitor C5, C7 is discharged through the resistor R1 and the on-resistance of the transistor Q1 or through the resistor R3 and the on-resistance of the transistor Q3. Since the emitter-collector resistance of the transistor Q1, Q3 is negligibly small as compared with that of the resistor R1, R3, the discharge time is decided by a time constant C5×R1 or C7×R3. When the transistors Q1, and Q3 are turned off, although current does not flow through capacitor C3 and diodes D1 and D3, the charge in capacitors C5 and C7 will discharge and then the voltage balance across diodes D1 and D3 will be lost. As a result, bias current flows through capacitor C3 and diodes D1 and D3 from one terminal of head 6L. The capacitance of the capacitor C3 is selected so as to pass the bias current component at the head.

The parallel connection between the head 6L and the resistor R1, R3 and capacitor C5, C7 thus reduces the bias current to the head 6L.

As above, the reduced bias current and the suppressed record signal are superposed at the one end of the head 6L and flow into the head 6L.

When the amplitude of the record signal decreases, the transistor Q1, Q3 are turned off. In this case, a bias current to the head 6L also flows to the capacitor C5, C7 to charge it to the peak value of the bias voltage. The charge current gradually increases contrary to the case while the transistor Q1, Q3 are turned on.

The operation for the right channel is similar to the left channel described as above, so the description therefor is omitted.

Figure 7:
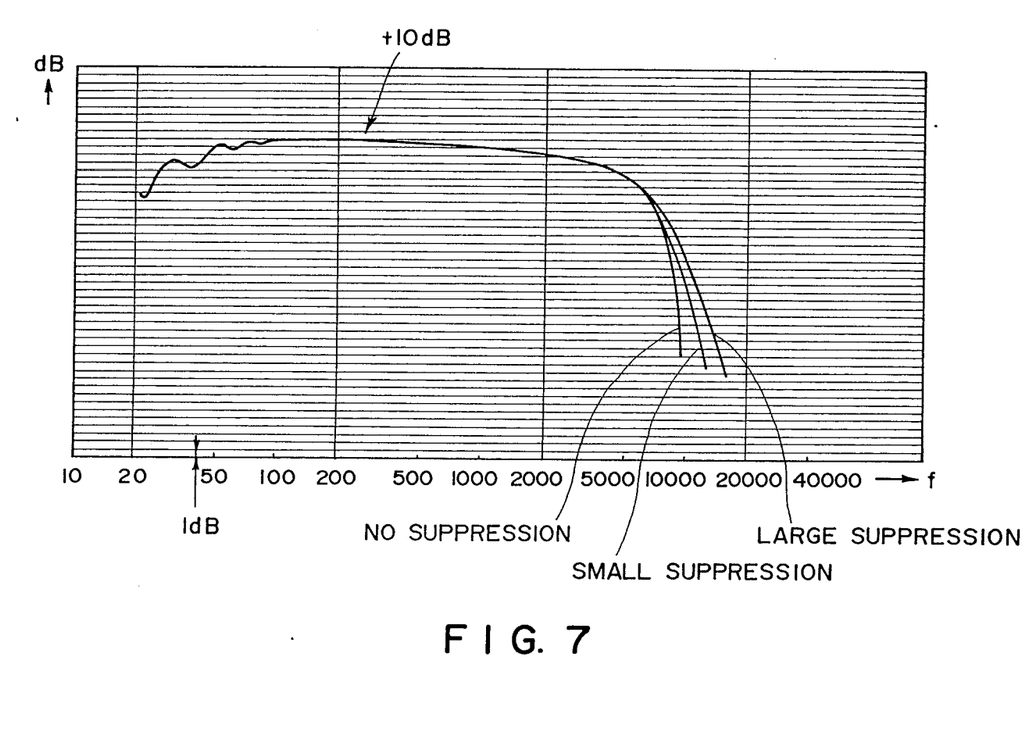
FIG. 7 shows the improvements for the frequency characteristics of the reproduced signal in the embodiment according to the present invention.

An example of the frequency response of this embodiment is shown in FIG. 7. As seen from the frequency response curve, the effect of the record signal suppression appears only at the high frequency range and no influence is found at the lower flat frequency response range. The reason for this is that an output voltage of the record signal amplifier 4L, 4R is increased at the high frequency range by the high frequency compensation by the amplifier (e.g., 4 dB at 10 KHz, 20 dB at 18 KHz), by the inductance of the head 6L, 6R, and by the constant current source resistance of the amplifier.

Figure 8A:
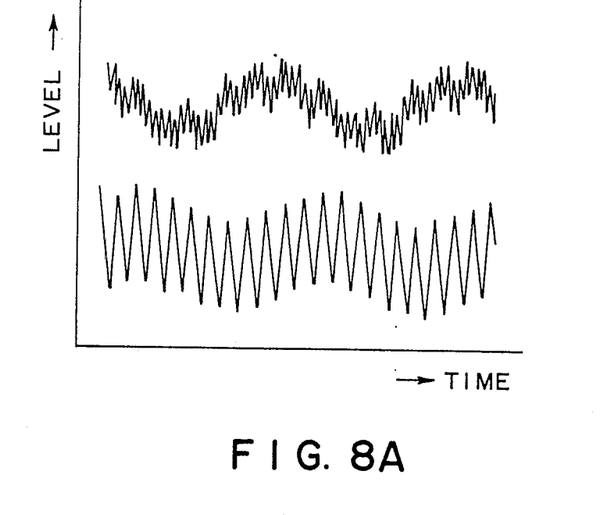
FIG. 8A and FIG. 8B show the waveforms of a voltage at the bias trap circuit and of a magnetic head current in the embodiment of FIG. 6.
Figure 8B:
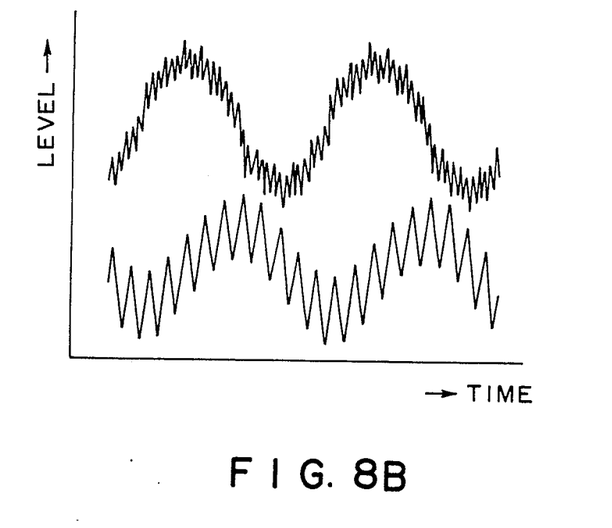

The waveforms of a voltage at point a before the bias trap circuit 5L and of a current flowing through the head 6L under suppression operation on this embodiment are shown in FIGS. 8A and 8B, respectively. FIG. 8A shows a voltage waveform of a record signal of 10 KHz, 0 dB, and FIG. 8B shows a current waveform of 10 KHz, 10 dB. As seen from the Figures, the recording current and bias current are not sliced at all. The waveforms are quite different from that obtained by slicing the voltage at the head as shown in FIG. 3.

Figure 9A:
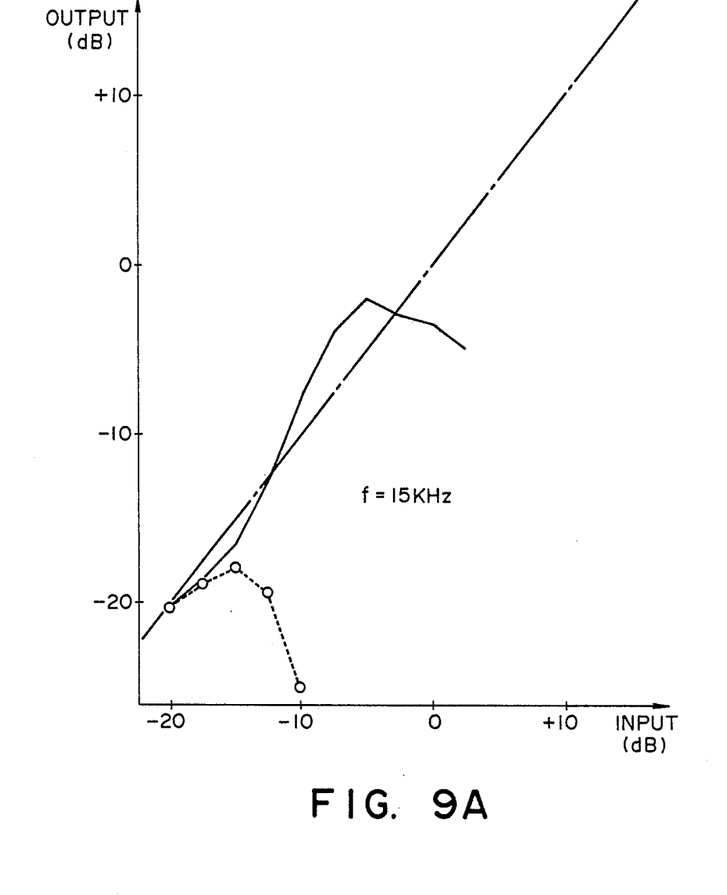
FIG. 9A and FIG. 9B show the improvements for the input vs. output characteristics of the reproduction in the embodiment of FIG. 6.
Figure 9B:
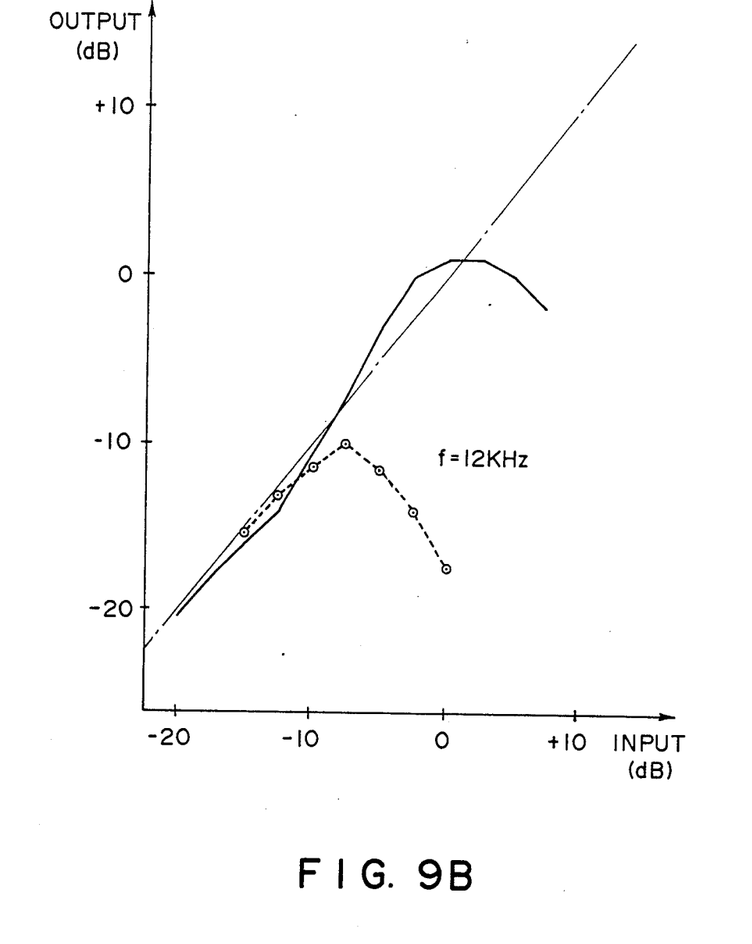

Further, according to this invention, the MOL at a high frequency range is considerably improved as shown in the input/output response curves of FIGS. 9A and 9B when compared with FIG. 2. This results from the reduction in record demagnitization and bias demagnetization. FIG. 9A shows the input/output response for a record signal of 15 KHz, and FIG. 9B for a record signal of 12 KHz. The solid lines represent this embodiment, whereas the broken lines represent the conventional ones.

Figure 10A:
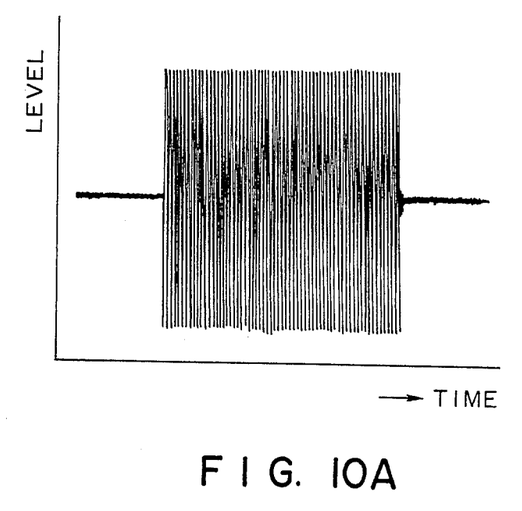
FIG. 10A and FIG. 10B respectively show the recording signal of tone-burst and the response in the embodiment of FIG. 6.
Figure 10B:
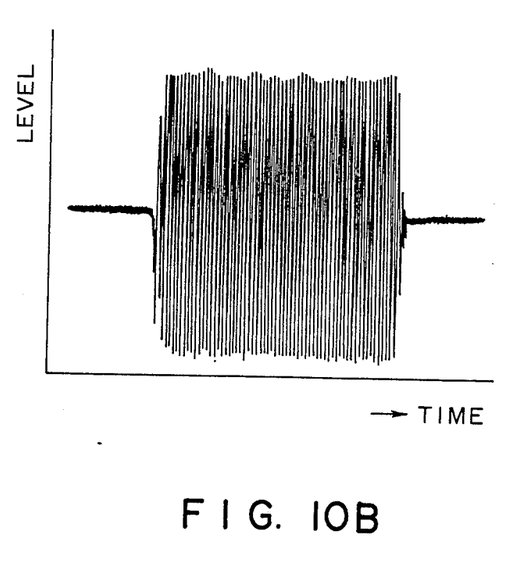

Magnetic recording with a quick response time and with fidelity can be achieved by this embodiment as apparent from the comparison between FIGS. 10A and 10B of this embodiment and FIG. 4 of the conventional one. FIG. 10A shows a record signal of a tone-burst at 10 KHz with 64 ONs and 32 OFFs, and FIG. 10B shows its response waveform. As seen from the envelope of the response waveforms of FIGS. 10A and 10B and FIG. 4, the response to a tone-burst attack is slow in the case of the Dolby-HXPRO. In contrast with the control of the bias signal oscillator through a feedback loop as in the Dolby-HXPRO, the present embodiment can control a bias signal very quickly.

As seen from the above description of the present invention, the bias current and/or record signal current is suppressed so that record and bias demagnetization is reduced to improve the high frequency characteristics, especially the MOL characteristics at a high frequency range.

Further, since a method of controlling the bias signal oscillator through a feedback loop is not used, the bias signal can be controlled quickly and hence magnetic recording with quick response to an input signal and with fidelity is possible.

Furthermore, the circuit construction is simple and economical with an improved high frequency performance as compared with a conventional one such as the Dolby-HXPRO. In addition, the circuit can be readily realized using the large part of a conventional circuit and is free of specific circuit adjustment.

What is claimed is:

1. A magnetic recording apparatus including a recording magnetic head, an AC bias constant current source for supplying an AC bias current to said magnetic head, and an AC bias current bypass circuit connected in shunt to said magnetic head for bypassing part of the AC bias current supplied by said AC bias source to reduce the AC bias current which flows through said magnetic head, wherein said bypass circuit comprises:

peak-hold means including capacitance means connected in shunt to said magnetic head for holding the peak value of an AC bias voltage across said magnetic head, and a discharge circuit connected across said capacitance means and including switching means which turns on in response to a predetermined large amplitude and high frequency reporting signal to discharge the peak value in said capacitance means so that part of the AC bias current flows into said capacitance means.

* * * * *